United States Patent [19]

Kato et al.

[11] Patent Number: 4,654,779
[45] Date of Patent: Mar. 31, 1987

[54] MULTIPROCESSOR SYSTEM INCLUDING FIRMWARE

[75] Inventors: Motokazu Kato, Sagamihara; Toshio Matsumoto, Kawasaki, both of Japan

[73] Assignee: Fujitsu Limited, Kawasaki, Japan

[21] Appl. No.: 534,125

[22] Filed: Sep. 20, 1983

[30] Foreign Application Priority Data

Sep. 24, 1982 [JP] Japan .................. 57-166068

[51] Int. Cl.⁴ .................. G06F 12/00; G06F 9/00; G06F 9/06
[52] U.S. Cl. .................. 364/200
[58] Field of Search ... 364/200 MS File, 900 MS File

[56] References Cited

U.S. PATENT DOCUMENTS 3,631,405 12/1971 Hoff et al. .................. 364/200
3,771,137 11/1973 Barner et al. .................. 364/200
4,253,144 2/1981 Bellamy et al. .................. 364/200

*Primary Examiner*—Raulfe B. Zache
*Assistant Examiner*—William G. Niessen
*Attorney, Agent, or Firm*—Staas & Halsey

[57] ABSTRACT

A multiprocessor system including firmware, which system is comprised of at least a plurality of central processing units and a main memory to be commonly occupied by all the central processing units. The main memory is composed of an operating system area and a firmware area. The firmware area is divided into a common firmware area utilized by all the central processing units and a plurality of independent prefix areas allotted to the central processing units. Each prefix area is operative as an interface port, for a respective central processing unit, between the operating system area and the common firmware area.

8 Claims, 7 Drawing Figures

MULTIPROCESSOR SYSTEM INCLUDING FIRMWARE

BACKGROUND OF THE INVENTION

The present invention relates to a multiprocessor system including firmware.

A central processing unit (CPU) of a data processing system generally fetches instructions sequentially from a main memory and then executes them sequentially. There are a variety of instructions, some of which, such as system control instructions, extended instructions, and instructions for emulating another processing unit, make the processing operations very complicated.

To simplify processing operations complicated due to such instructions, it is advantageous to use firmware. "Firmware" is a group of program routines which are composed of ordinary instructions for performing the functions of such special instructions.

The inventors have previously attempted to construct a firmware area in the main memory in addition to the usual operating system area.

When such a construction is applied to a multiprocessor system, it is necessary to form a plurality of prefix areas for the CPU's and, at the same time, a plurality of firmware areas for the CPU's. That is, each CPU must occupy both prefix and firmware areas in the main memory. There is, however, a problem with the above-mentioned construction, especially in a multiprocessor system. The function of the firmware is limited to some extent. Since firmware areas are allotted to all the CPU's independently, a sufficient amount of the program routines cannot be shared by each CPU due to the limited memory size of the main memory.

SUMMARY OF THE INVENTION

It is an object of the present invention to provide a multiprocessor system including firmware using a considerably small area of the main memory and still allowing CPU's to use sufficient amounts of program routines, that is, a multiprocessor system including firmware maintained as it is, but using a small area in the main memory.

The above object is attained by allotting, in the main memory, a common firmware area to all the CPU's, but allotting individual prefix areas to each CPU. Each prefix area is operative as an interface port for the respective central processing unit between the operating system area and the common firmware area. The use of the common firmware area by each said central processor is provided through the respective prefix area by an instruction to use the firmware that is generated in an operating system area. By the use of each prefix area, a reentrant structure is provided, namely wherein after completion of operation according to a desired part of the firmware, a reentrant structure is provided with respect to each specific prefix area, so that a reentrant characteristic is provided to return the processor to the respective instruction in the operating system for continuing operation.

BRIEF DESCRIPTION OF THE DRAWINGS

The present invention will be more apparent from the ensuing description with reference to the accompanying drawings wherein.

DESCRIPTION OF THE PREFERRED EMBODIMENTS

Figure 1:
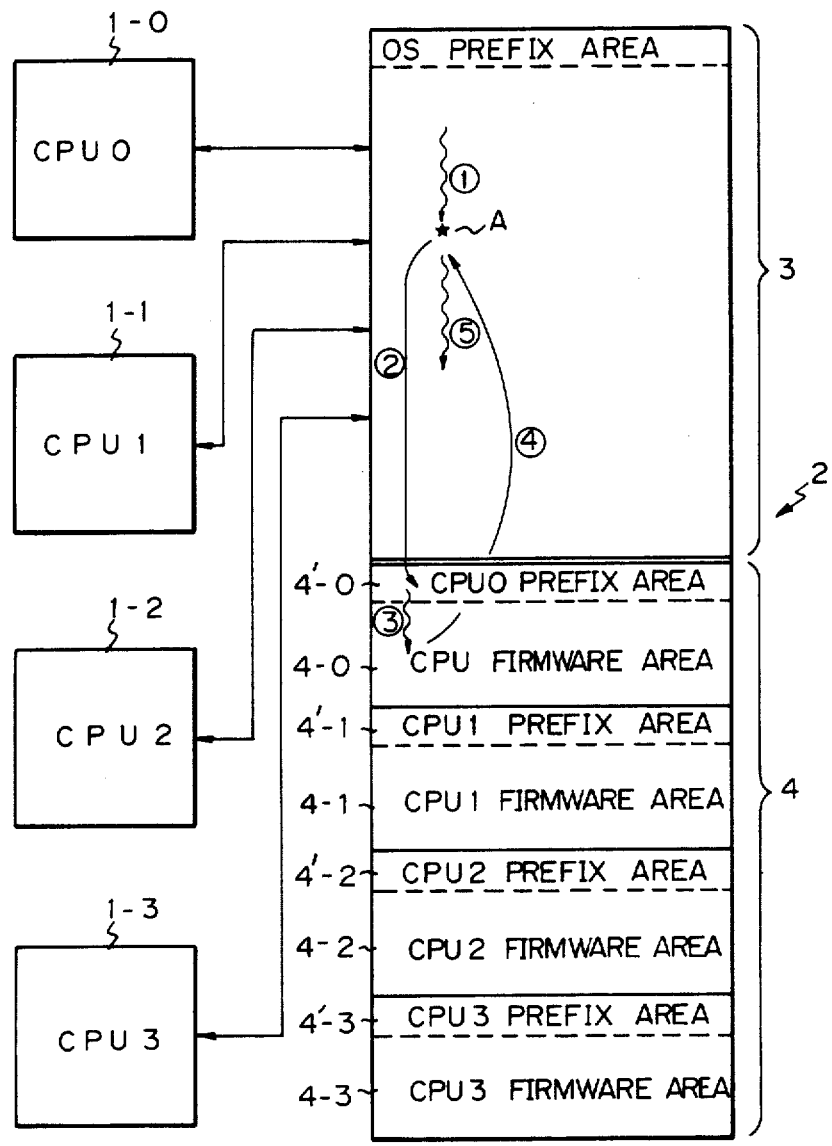
FIG. 1 is a schematic general view of a multiprocessor system including firmware according to a previous attempt by the present inventors.

FIG. 1 is a schematic general view of a multiprocessor system including firmware according to a previous attempt by the present inventors. In FIG. 1, reference numerals 1-0 through 1-3 represent CPU's when, for example, four CPU's are employed. Reference numeral 2 represents a main memory.

In a multiprocessor system, the main memory 2 is occupied in common by the CPU's 1-0 through 1-3. The inventors attempted to introduce firmware into the main memory 2. Thus, the memory 2 was basically divided into the usual operating system (OS) area 3 and a general firmware are 4. The OS area 3 contained a program module and data used by the OS and by processing programs operative under the OS itself. The general firmware area 4 was operative to achieve a firmware function cooperating with program routines and the like.

In the multiprocessor system of FIG. 1, the same number of firmware areas as CPU's were formed. When the firmware was activated, the operation was switched from the OS area 3 to one of the individual firmware areas, i.e., the firmware area to be occupied by the CPU just activated by the firmware.

The firmware areas 4-0 through 4-3 cooperated with prefix areas 4'-0 through 4'-3. The prefix areas 4'-0 through 4'-3 also corresponded to the CPU's 1-0 through 1-3. Each of the prefix areas functioned as an interface port between the OS area 3 and each corresponding firmware area.

The operation of the previous system will be clarified by the following examples. Suppose that the CPU 1-0 encountered at a step A an instruction indicating that the firmware should be used during a process ① in the OS area 3. Such an instruction to use the firmware could be distinguished by an operation code of the instruction composed of, for example, E5XX or B2XX expressed in hexadecimal notation. The characters XX indicated arbitrary hexadecimal numbers used for indicating detailed classifications, thus forming a sub-operation code. The operation code, such as E5 or B2, could be detected by a suitable decoder mounted in each CPU.

When the decoder of the CPU 1-0 recognized that the instruction to use the firmware was generated, the prefix area 4'-0 for the CPU 1-0 was referenced through a process ②, in which a so-called interrupt action was performed. Thus, the program routines in the firmware area 4-0 were executed along a process ③. When the execution of the program routines was completed, the operation returned to the step A, where the above-mentioned interrupt action had been activated in the OS area 3, along a process ④. So after this, the inherent processing started again with the step following the step A along a process ⑤. The above operations for the CPU 1-0 also applied to the other CPU's (1-1, 1-2, 1-3).

As will be apparent from the above, the multiprocessor system including the firmware area 4 of FIG. 1 suffered from the problem of limited firmware function. That is, since firmware areas were allotted for each CPU, it was difficult to enlarge the firmware function due to the memory size allotted thereto. Thus a large processing capability of the system could no longer be expected.

A multiprocessor system including firmware of the present invention, however, has the advantage that the size of the firmware area to be allotted in the main memory can be made small, without reducing the function of the firmware itself.

As is well known, firmware is provided for supporting the operation of the related hardware with the co-operation of a software procedure. Thus, the firmware is generally defined as one of the constituents composing the hardware. Under such an understanding when considering to introduce a firmware area into a part of the main memory, a person skilled in the art would ordinarily first employ separate firmware for each hardware, i.e., CPU's, as constructed in FIG. 1. The above-mentioned architecture, however, is not preferred from the view point of economical use of the main memory, as previously mentioned.

According to the present invention, therefore, the firmware areas for all CPU's are combined into a common single firmware area.

Figure 2:
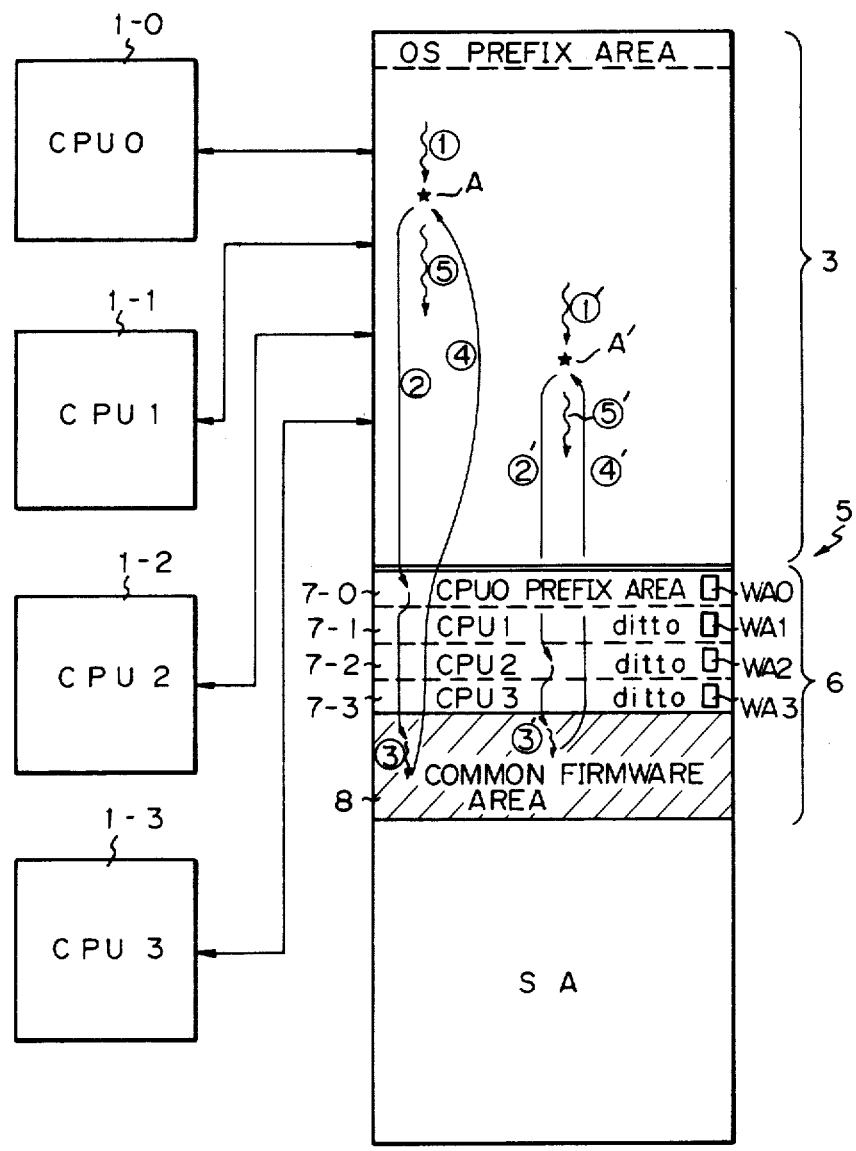
FIG. 2 is a schematic general view of a multiprocessor system including firmware according to the present invention.

FIG. 2 is a schematic general view of a multiprocessor system including firmware according to the present invention. In FIG. 2, reference numerals the same as those in FIG. 1 represent the same members. CPU's 1-0 through 1-3 fetch and execute instructions from the OS area 3. In a firmware area 6 of a main memory 5, prefix areas 7-0 through 7-3 corresponding to CPU's 1-0 through 1-3, are mounted.

The program routines to be executed under the special instruction to use the firmware are common to all the CPU's. Thus a common firmware area 8 is formed. In the common firmware area 8, however, there is a possibility of conflict in execution of the same instruction or program routines between two CPU's. Such a conflict cannot be prevented if the prefix areas are formed in common, like the common firmware area 8. This is why the prefix areas are formed in correspondence with the CPU's 1-0 through 1-3.

It is required to construct each prefix area (7-0 through 7-3) in the form of a so-called reentrant structure. To be specific, a so-called work area WA (refer to WA0 through WA3 in FIG. 2) is introduced into each prefix area (7-0 through 7-3). Since the prefix area functions as an interface port for the CPU's the work areas must not be formed in common to the CPU's. If they were, data for one CPU would unintentionally be rewritten by data for another CPU. This would cause a conflict in operation therebetween.

Alternatively, it may also be possible to leave an operation for one CPU idle until another conflicting CPU completes its operation, if it is detected that the address provided from one CPU for accessing the memory 5 coincides with the address provided from another CPU. Since one CPU would have to wait for a while, the operation speed of the system would, however, be somewhat reduced according to this alternative way.

As understood from FIG. 2, the common firmware area 8 makes it possible to use less memory area in the main memory than the independent firmware areas 4'-0 through 4'-3 of FIG. 1. For example, in FIG. 1, 16(4×4) KByte areas for the prefix areas 4'-0 through 4'-3 and 48(12×4) KByte areas for the firmware areas 4-0 through 4-3, i.e., 64 KByte areas in all, are needed. In FIG. 2, however 16(4×4) KByte areas for the prefix area 7-0 through 7-3 and 12(12×1) Kbyte areas for the common firmware area 8, i.e., 28 KByte in all, are needed. As a result, 36(64−28) KByte areas are saved by the present invention. The area thus saved is represented by reference characters SA in FIG. 2.

With reference to FIG. 2, whether each of CPU's 1-0 through 1-3 is being operated with the OS area 3 or with the firmware area 6 can be distinguished in accordance with a mode indication given by a suitable mode indication part (not shown in FIG. 2) for each CPU. The gist of the mode indication is changed every time each CPU executes the instruction to use the firmware.

Each of an operating system prefix area (refer to the top of the OS area 3) and the firmware prefix areas 7-0 through 7-3 has a size of, as another example, 4 KByte and is provided with both an area for loading each new program status word (PSW) and an area for momentarily saving an old PSW. The new PSW has a variety of information in accordance with a variety of the interrupts.

The switching operation from the OS area 3 to the common firmware area 8, when the instruction to use the firmware is generated, is achieved in a manner substantially the same as the switching operation to an interrupt processing routine activated by a program interrupt, as usual. In this case, however, since one of the firmware prefix areas 7-0 through 7-3, corresponding to the CPU which requires the firmware, is referenced when the aforesaid mode indication is changed, the related new PSW is transferred to the corresponding CPU. Thereafter, the switching of the operation from the OS area 3 to the common firmware area 8 is completed.

The operation will be clarified by the following example. Suppose that the CPU 1-0 executes, during a process ①, the instruction to use the firmware. Then, an interrupt action is performed by referring to the corresponding prefix area 7-0 during a process ②. That is, the program status word immediately before the occurrence of the interrupt is momentarily saved in the old PSW formed in the prefix area 7-0. At the same time, the present program status word is set in the new PSW formed in the prefix area 7-0. The content of the new PSW is also transferred to a corresponding register in the corresponding CPU 1-0. The operation is thereby completely switched to the common firmware area 8. Accordingly, the desired firmware processing can be performed during a process ③. When the executions of the instructions of the common firmware area 8 are completed, another instruction starts being executed during a process ④, by which instruction the gist which has been saved in the old PSW of the prefix area 7-0 is restored in the PSW register of the corresponding CPU 1-0. The inherent operation thereby recommences in the OS area 3 and is continued during a process ⑤.

The above-mentioned operation is also applied to another CPU. Suppose that the CPU 1-2 executes, during a process ①', the instruction to use the firmware. Then, an interrupt action is performed during a process ②', with reference to the old and new PSW of the prefix area 7-2. The program routines of the common firmware area 8 are thereby referred to. Since the firmware area 8 is commonly occupied by the CPU's 1-0 through 1-3 each of the CPU's executes the same instructions or routines, if the same kind of instruction to use the firmware is generated. The following processes ③', ④', and ⑤' are identical to the processes ③, ④, and ⑤, respectively.

The common firmware area 8 is thus operated as mentioned above. No trouble is produced, during the switching of the operation between the CPU's 1-0 through 1-3 which commonly utilize the firmware area 8. This is because, first, area are mounted in each prefix areas and, second, the CPU's each include prefix registers. With the use of each prefix register, a fixed address is given to each CPU through a prefix conversion. Thus, the CPU's are managed under respective corresponding fixed addresses, and, thus, no trouble is induced therebetween.

As explained above, the multiprocessor system of the present invention shown in FIG. 2 can considerably reduce the space taken by the firmware area in the main memory when compared with that in FIG. 1. Accordingly, the function of the firmware can be enlarged, since a relatively small area is needed for the firmware area in the main memory. Further, if another CPU is additionally employed in the multiprocessor system, it is not required to newly prepare a firmware area for the additional CPU, because the common firmware area is also available therefor.

Figure 3:
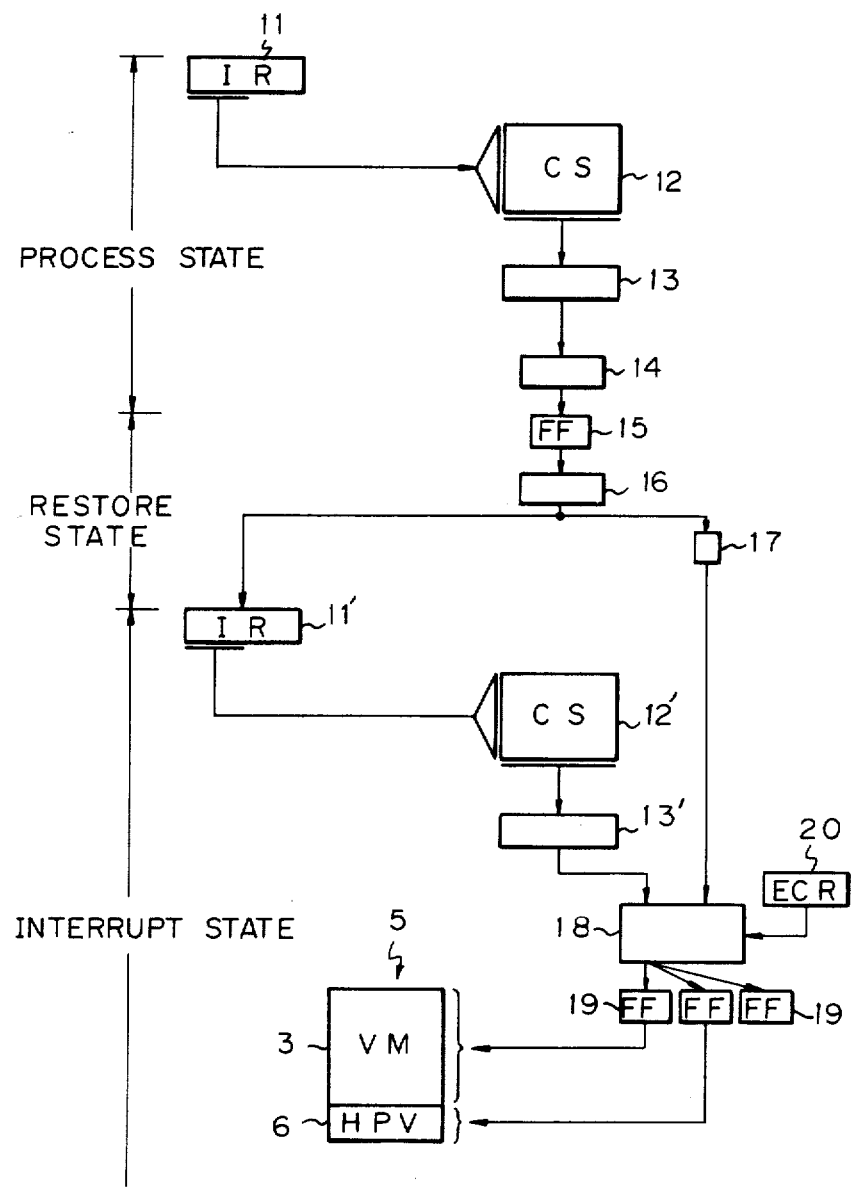
FIG. 3 shows a microprograming type processor having a control storage which contains microinstructions.

FIG. 3 shows a microprograming type processor having a control storage which contains microinstructions. It should be noted that the term "firmware", referred to in the present invention, denotes the program routines created by the same kind of instructions as those stored in the OS area, which program routines are used for executing routines specified by ordinary instructions, i.e., instructions supported by the hardware of the CPU's or the microinstructions, when each special instruction, i.e., the instructions not supported by the hardware or the microinstructions, is provided, in order to perform the function of the special instruction through the routine specified by the ordinary instructions. Thus, the term "microprogram" is distinguished from the term "firmware", particularly in the present invention, although it is usually referred to as "firmware" elsewhere. The control storage shown in FIG. 3 is mounted in each CPU so as to store such microprograms. In FIG. 3, the flow architecture is classified into three major states, i.e., a process state, a restore state, and an interrupt state. The main memory 5 comprising the OS area 3 and the firmware area 6 corresponds to that shown in FIG. 2. The OS area 3 inherently belongs to the category of a so-called virtual machine VM, while the firmware area 6 inherently belongs to the category of a so-called hypervisor (HPV).

During the operation in the OS area, the instruction to use the firmware is recognized by decoding data stored in a part of an instruction register (IR) 11 and then by referring to the corresponding microinstructions loaded in a control storage (CS) 12. Next, information for generating a program interrupt is maintained in a TAG register 13 until the related instruction is completely executed. In a selection circuit 14, an instruction having the highest priority among the variety of instructions is selected. Then, a control flip-flop 15 is set so as to maintain a state of an interrupt process. At the same time, the state in the CPU is also changed via a control circuit 16, which state is maintained by a HPV/VM state flip-flop 17. That is, the flip-flop 17 indicates whether the CPU is now running in the OS side or the firmware side.

If a program interrupt process is specified, a private operation code is set in an instruction register (IR) 11', the same as in the instruction register 11. Thus, the corresponding microprogram is activated again. Then, an access control circuit 18 is driven in accordance with information stored in a TAG register 13', the same as in the TAG register 13. Here, various operations are achieved, such as storage of the old PSW and fetching of the new PSW, both for the program interrupt and for storage of additional information available for realizing high speed processing of the firmware.

A plurality of access control flip-flops 19 is set in accordance with such various kinds of accesses. One of the flip-flops 19 is set for accessing the VM area 3, and another is set for accessing the HPV area 6. If the HPV area 6 is accessed, a base address for specifying each of the prefix areas 7-0 through 7-3 (shown in FIG. 2) is given from an extended control register (ECR) 20.

When the processing in the firmware is finished, the operation is restored to the process indicated by the old PSW, at which process the interrupt action has been activated. In this case, a particular instruction is produced in the firmware, which instruction indicates that the HPV/VM state flip-flop 17 should be reset to the initial state.

With reference to FIG. 2 again, it is important to construct each of the prefix areas 7-0 through 7-3 in the form of the reentrant structure, as explained previously. Accordingly, the work areas WA0 through WA3 are introduced into the prefix areas 7-0 through 7-3, respectively. In this case, the common firmware area 8 must be guaranteed to achieve a store operation or a write operation with respect to each working area (WA0 through WA3) of the prefix areas 7-0 through 7-3. If such a store or write operation for the working area is impeded, it would be impossible to create the reentrant structure of the prefix areas.

However, in actuality, the store or write operation to the working area is often impeded. Generally, in a CPU, an instruction check is performed by means of an instruction check mechanism every time an instruction is executed.

Of these checks, the so-called key check is particularly pertinent to the present invention. The key check is mainly intended to protect the contents of the main memory 5. If certain contents of the memory 5 must be maintained as they are, i.e., no store or write operation must be achieved for the contents, the key indicates protection of the memory. In this case, the protection must be valid for the OS area 3 only, but be invalid for each working area, so as to create the reentrant structure. In other words, the protection of the memory must be valid only in the OS area 3. Thus, the indication for the protection must always be taken into consideration every time the operation is switched from the firmware area 6 to the OS area 3, whereas the indication for the protection must always be ignored every time the operation is achieved in the firmware area 6. Such validation or invalidation of the key indicating the protection should preferably be completed at high speed and with the aid of hardware.

Figure 4:
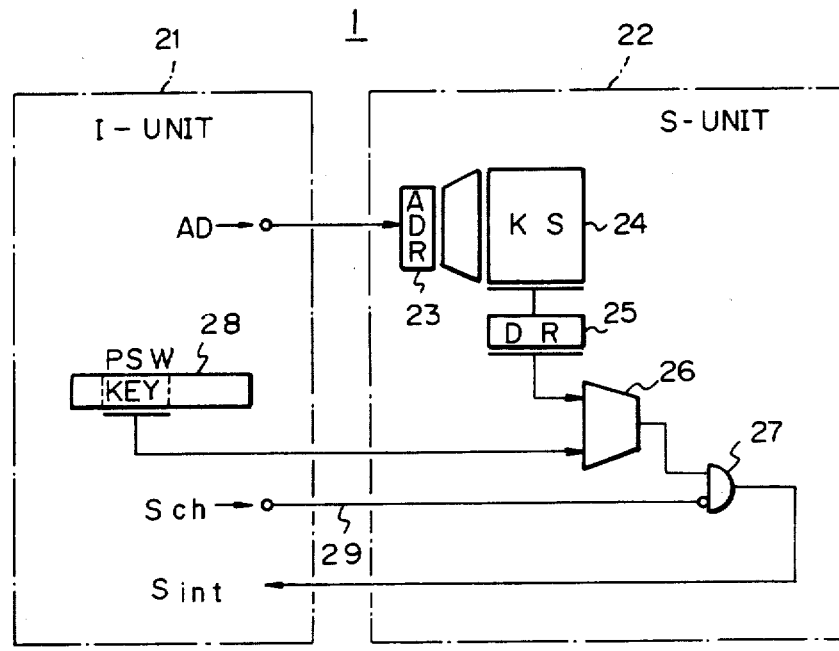
FIG. 4 is a block diagram of a CPU containing a key check circuit preferably introduced into the system in FIG. 2.

FIG. 4 is a block diagram of a CPU containing a key check circuit preferably introduced into the system in FIG. 2. The CPU 1 of FIG. 4 is representative of the CPU's 1-0 through 1-3. The CPU 1 contains an instruction control part, i.e., an I-unit 21, and a storage control part, i.e., an S-unit 22. Reference numerals 23 represent an address register (ADR), 24 a key storage (KS), 25 a data register, 26 a comparating circuit, 27 an AND gate, 28 a PSW and 29 a signal line transferring validation/invalidation information for the check.

When an address AD for accessing the storage 24 is transferred from the instruction control part 21 to the storage control part 22, the address AD is momentarily stored in the address register 23. On the other hand, the main memory 5 (FIG. 2) is usually divided into 2048 Byte blocks as units of protection.

A seven-bit control field, called a "main memory key", is prepared for each unit block. Each main memory key is stored in the key storage 24, and one of the stored keys, specified by the address AD, is read and set in the data register 25. On the other hand, in the PSW 28, a protection key (KEY) is set to be compared with the main memory key, so that the protection key is used for the purpose of determining a protection range in the main memory 5. Thus, the comparing circuit 26 compares the protection key with the gist of the data register 25. On the other hand, a signal $S_{ch}$ is supplied to the AND gate 27, which signal $S_{ch}$ controls the validation or invalidation of the key check operation in accordance with each instruction or each specified mode. If the protection of the main memory is required according to the result of the comparison by the circuit 26, a signal $S_{int}$ is generated via the AND gate 27, which signal $S_{int}$ is a signal for demanding an interrupt, i.e., demanding memory protection. The simple hardware of the AND gate 27 is very useful for the intended high speed performance of the previously mentioned validation or invalidation of the key.

Figure 5:
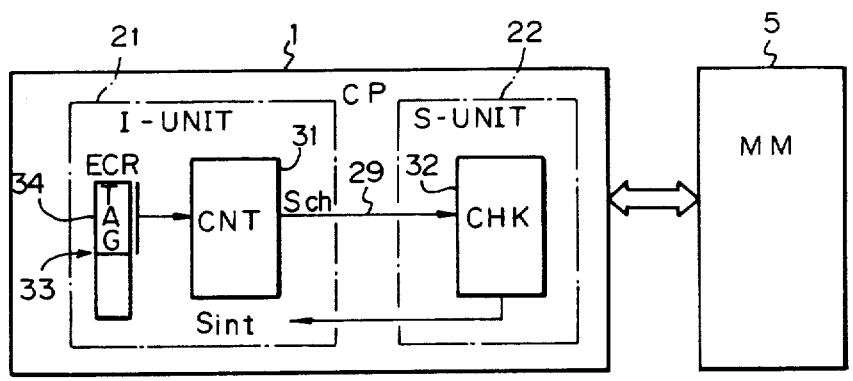
FIG. 5 is a block diagram of a CPU and main memory redrafted for facilitating understanding of the operation of a CPU of FIG. 4.

FIG. 5 is a block diagram of the CPU 1 and the main memory 5, redrafted for facilitating the understanding of the operation in the CPU 1 of FIG. 4. Members the same as those of FIG. 4 are represented by the same reference numerals or characters. Reference numeral 31 represents a control circuit (CNT). The control circuit 31 is active during the operation in the firmware area 6 of FIG. 2 and operates to produce the signal $S_{ch}$, on the line 29, to control the validation or invalidation of the key check, in accordance with a control tag 34 set in an extended control register (ECR) 33.

A check circuit (CHK) 32 works to achieve the key check, explained with reference to FIG. 4. That is, if the signal $S_{ch}$ indicates the validation of the key check and also if the key check specifies the protection of the main memory 5, the check circuit 32 produces the signal $S_{int}$ for demanding an interrupt. For example, if such demand of interrupt is activated in the firmware area 6, the main memory protection process is treated as an interrupt action with respect to the instruction, generated in the OS area 3, namely to use the firmware area 6.

The content of the ECR 33 can be updated by the information from the firmware area 6. That is, a suitable control tag 34 is set, in advance, according to the variety of instructions to be executed in the firmware area 6. Thereby, the control circuit 31 can be informed of the control information of the validation or invalidation of the key check.

Figure 6:
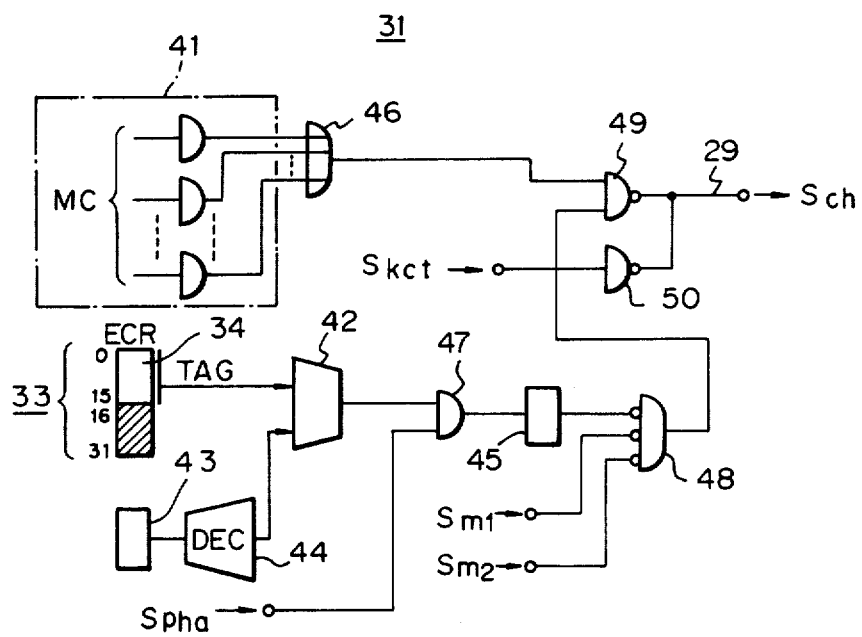
FIG. 6 is a detailed circuit diagram of a control circuit in FIG. 5.

FIG. 6 is a detailed diagram of the control circuit 31 shown in FIG. 5. The members 29, 33, and 34 are identical to those of FIG. 5. Reference numeral 41 is an instruction code analyzing part, 42 a comparating circuit, 43 an instruction B part register, 44 a decoder (DEC), 45 a flip-flop, 46 an OR gate, 47 and 48 AND gates, and 49 and 50 NAND gates.

In the extended control register 33, the control tag 34 is set therein with, for example 16 bits. The control tag 34 provides, as mentioned before, control information whether the key check should be valid or invalid. Each bit of the 16 bit control tag corresponds to 16 base registers, respectively, which are used by the firmware area 6. Thus, it is possible for independent base registers to independently specify whether the check of the main memory protection should be performed or not.

In the instruction B part register 43, 4 bit information for specifying the base register is set every time the instruction starts being executed, which 4 bit information is contained in an operand part of the instruction fetched from the main memory. The information for specifying the base register is decoded into 16 bit data by means of the decoder 44. The decoded data is compared, in the comparating circuit 42, with the control tag 34. The resultant signal of the comparison is set in the flip-flop 45, via the AND gate 47, at the timing of generation of a phase A release signal. The phase A release signal $S_{pha}$ is generated at a timing, as shown in FIG. 7, where the state of the CPU in execution of the instruction is switched from phase A (PHASE-A) to phase B (PHASE-B).

Figure 7:
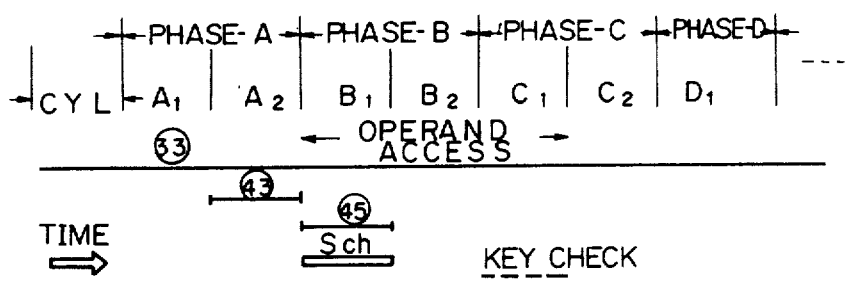
FIG. 7 is a timing chart explaining the operation of the circuits shown in FIGS. 4 through 6.

FIG. 7 is a timing chart explaining the operation of the circuits shown in FIGS. 4 through 6. The above-mentioned flip-flop 45 is available for timing adjustment of the so-called machine cycle defining the operations in the CPU.

The AND gate 48 receives three inverted signal, namely an output signal from the flip-flop 45, a mode indication signal $S_{m1}$, and a mode indication signal $S_{m2}$. The signal $S_{m1}$ indicates a mode in which the concerned system is operative with the firmware function and, at the same time, the system is now under use of the firmware. The signal $S_{m2}$ indicates a mode in which the operation is now running in the firmware area. In this case, the information from the flip-flop 45 is given to the NAND gate 49, when two conditions stand simultaneously, i.e., the first of which is indicative of a usage of the firmware area and the second of which is indicative of actual running of the firmware area.

On the other hand, the NAND gate 49 receives data from the instruction code analyzing part 41 via the OR gate 46. The part 41 analyzes microcodes MC for respective instructions. Thus, the NAND gate 49 produces, on the line 29, the signal $S_{ch}$ for controlling the validation or invalidation of the key check, in synchronization with a key check timing signal $S_{kct}$ via the NAND gate 50. The signal $S_{ch}$ on the line 29 is at logic "0" if the key check is invalid, or the $S_{ch}$ is logic "1" if the key check is valid.

The executions of the instructions are performed as depicted in FIG. 7. In this figure, each segment divided by the vertical lines corresponds to one machine cycle CYL of the CPU. The PHASE-A is a phase composed of an "$A_1$" state in which each instruction is decoded and an "$A_2$" state in which the data, used for calculation of the operand address, are read from the base register and an index register. A PHASE-B is a phase composed of a "$B_1$" state in which the operand address is generated and a "B$_2$" state in which a data of a buffer is read. When the phase is switched from the PHASE-A to the PHASE-B, the flip-flop 45 of FIG. 6 is set and thereafter, the control for the validation or invalidation of the key check commences. In a "C$_1$" state, the data are read from the buffer and the register and then the instruction is executed in the following "C$_2$" and "D$_1$" states. The concerned key check is achieved in the "B$_2$" and "C$_1$" states. In FIG. 7, reference characters ㉝, ㊸, and ㊺ represent the operations achieved ECR 33, the register 43, and the flip-flop 45, respectively.

The most important part regarding the key check is represented by the AND gate 27 of FIG. 4. That is, only when the operation is switched from the firmware area 6 to the OS area 3, does the protection of the main memory become effective. The switch from the firmware area to the OS area is detected by the signal from the comparating circuit 26. When the signal indicating the switch from the firmware area to the OS area is produced from the comparating circuit 26 and, at the same time, the signal S$_{ch}$ indicates that the key check is valid (logic "0"), the signal S$_{int}$ is produced from the AND gate 27, which signal S$_{int}$ of logic "1" indicates that the interrupt action for performing the memory protection is needed.

What is claimed is:

1. A multiprocessor system comprising a plurality of central processing units and a main memory which is commonly occupied by all the central processing units, wherein the storage capacity of said main memory is divided to include an operating system area and a firmware area, the firmware area is divided into a common firmware area utilized by all the central processing units and a plurality of independent prefix areas respectfully allotted to the central processing units, each said prefix area is operative as an interface port for the respective central processing unit between said operating system area and said common firware area, each said prefix area including a region which is operative, when program execution by a particular processor is switched from the operating system area to the firmware area, to provide a new program status word to the respective processor for running in a respective part of the common firmware area and for storing an old program status word from the running of said processor in said operating system area, for return thereto after said running in said common firmware area, and said operating system area stores programs defined by ordinary instructions which can be executed directly by hardware or microinstructions of the central processor units, and said firmware stores programs defined by special instructions which cannot be executed directly by the hardware of the microinstructions of the central processor units, by wherein said special instructions of the firmware can be executed in terms of said ordinary instructions.

2. A multiprocessor system as set forth in claim 1, wherein the use of said common firmware area by each said central processing unit occurs through the respective prefix area by an interrupt instruction to use a respective part of the common firmware area that is generated in said operating system area to provide the respective new program status word and to save the old program status word.

3. A multiprocessor system as set forth in claim 2, wherein each of said prefix areas is constructed in a form of a reentrant structure, for returning the respective central processing unit to the respective position of said old program status word after each said use of the common firmware area.

4. A multiprocessor system as set forth in claim 3, wherein a working area is included in each said prefix area so as to create the reentrant structure by providing storage for the old program status word.

5. A multiprocessor system as set forth in claim 4, comprising means for performing a key check for protecting said main memory from a write operation, for invalidating said key check for each said working area, and for validating said key check every time the operation is switched from said firmware area to said operating system area, to protect said main memory from a write operation.

6. A multiprocessor system as set forth in claim 5, each said central processing unit comprising a storage control unit with a check circuit for specifying said validating and invalidating of said key check, an instruction control unit including a control circuit for providing an output for controlling said check circuit of the respective central processing unit, and an extended control register for setting a control tag, wherein said control tag includes information for an instruction check, said control circuit is responsive to said control tag set in said extended control register, and said control tag set in said extended control register can be updated by the firmware.

7. The system of claim 6, said storage control unit including a gate for providing an interrupt demand to said instruction control unit according to the result of said key check and said output of said control circuit.

8. The system of claim 7, said output of said control circuit having logic level "0" for said validity of said key check, and said gate being an AND gate having as an input the inverted value of said output of said control circuit.

* * * * *

UNITED STATES PATENT AND TRADEMARK OFFICE
CERTIFICATE OF CORRECTION

PATENT NO. : 4,654,779
DATED : March 31, 1987
INVENTOR(S) : Motokazu Kato, Toshio Matsumoto It is certified that error appears in the above-identified patent and that said Letters Patent is hereby corrected as shown below:

Column 2, line 34, "are" should be --area--.

Column 3, line 6, "So" should be --Soon--;
line 27, "understanding" should be --understanding,--.

Column 4, line 14, "Kbyte" should be --KByte--.

Column 5, line 19, "areas" should be --area--.

Column 8, line 37, "signal," should be --signals,--.

Column 9, line 10, after "achieved" insert --by the--.

Column 10, line 1, "by" should be --but--.

Signed and Sealed this

Twenty-fifth Day of August, 1987

Attest:

DONALD J. QUIGG

Attesting Officer

Commissioner of Patents and Trademarks